INVENTORS
Harold J. Donald
Carl E. Dewald
Robert J. Caiola

BY

AGENT

INVENTORS.
Harold J. Donald
Carl E. Dewald
Robert J. Caiola
BY
AGENT

United States Patent Office 3,684,554
Patented Aug. 15, 1972

---

3,684,554
METHOD FOR THE VAPOR PHASE SURFACE SULFONATION OF PLASTIC WEBS
Harold J. Donald, 2612 Oxford Drive, Midland, Mich. 48640; Carl E. Dewald, 1306 Wallen, Findlay, Ohio 45840; and Robert J. Caiola, 452 S. 7th St., Saginaw, Mich. 48006
Filed June 2, 1969, Ser. No. 829,453
Int. Cl. B44d 1/092; C07b 13/00
U.S. Cl. 117—47 A                                   12 Claims

ABSTRACT OF THE DISCLOSURE

A process and apparatus for the rapid vapor phase sulfonation of plastic webs wherein the plastic web is treated with a blast of gaseous sulfur trioxide. Optional steps include predrying the web and scrubbing it free of excess sulfur trioxide with blasts of dry inert gases. The invention also provides for further treatment of the plastic web with fluid neutralization agents or metal salt solutions.

BACKGROUND OF INVENTION

This invention relates to apparatus and method for the vapor phase sulfonation of plastic webs.

It is known from U.S. Pat. 2,400,720 that aromatic plastic films can be placed in an atmosphere of sulfur trioxide ($SO_3$) to produce a sulfonated film of desirable properties. However, when this technique was tried on a large volume production unit with a moving plastic film or web it was found that an intolerable amount of $SO_3$ escaped in the surrounding atmosphere with the moving film and that moisture in the air or on the plastic web more or less completely inhibited the sulfonation reaction. This is believed to be due to the formation of sulfuric acid droplets when the $SO_3$ contacts any moisture clinging to the film. Furthermore, this method required a relatively long residence period in the $SO_3$ atmosphere to achieve adequate sulfonation. The net result was that the plastic web was not uniformly sulfonated and the process was too slow.

SUMMARY OF INVENTION

It now has been discovered that plastic or polymer webs can be rapidly and uniformly surface sulfonated by a process and apparatus in which the polymer web is contacted with a blast of dry gaseous sulfur trioxide in a substantially dry atmosphere.

The process and apparatus of this invention is useful in the large volume production of treated polymer webs where high web speeds, e.g., up to 1000 feet per minute, are desired with uniform sulfonation. The invention is particularly applicable to the rapid sulfonation of transparent oriented polystyrene film wherein the clarity of the film must be maintained even though it is sulfonated with or without neutralization.

DETAILED DESCRIPTION OF INVENTION

According to the process of the present invention polymer webs such as plastic films, cellular plastics and laminated plastic films are surface sulfonated with pure or dilute gaseous sulfur trioxide ($SO_3$) by the step of contacting the web surfaces with a continuous blast of gaseous $SO_3$ in a substantially dry atmosphere. It is essential to this invention that the gaseous atmosphere contained in, associated with, or in contact with the sulfonation treatment zones of this invention be substantially dry. Likewise, it is essential that the polymer web to be treated is either substantially dry or rendered dry by a drying step prior to the sulfonation step.

The drying step is to remove surface moisture from the polymer web since the presence of moisture causes the formation of sulfuric acid when $SO_3$ contacts the moisture. The presence of sulfuric acid droplets on the polymer web interferes with the uniform sulfonating of the polymeric surface or surface layers. This drying step, when used, can be accomplished by a drying oven, a blast of dry inert gas, or by moving the polymer web through a chamber of dry inert gas which is maintained in a dry condition by suitable recirculating and drying means. For the purpose of this invention, the term dry gas means one having a dew point below 10° C. It is preferred to use a gas having a dew point below —40° C. The use of a blast of a dry inert gas is preferred since this positive force of gas molecules has a scrubbing or scouring action on the web surface which substantially removes all the water molecules. For the purposes of this invention a "blast of gas" is intended to mean a sheet or curtain of gas molecules flowing at a rate greater than 10 feet per second and preferably in the range from about 100 to about 200 feet per second.

It is to be understood that the drying step can be dispensed with when the ambient air of the laboratory or plant is already sufficiently dry as in periods of low humidity during wintertime or in naturally dry, desert-like atmospheres.

The essential step in this process involves contacting the dry polymer web with a continuous blast of gaseous $SO_3$. This step involves relative movement of the polymer web into a curtain, sheet, or blast of gaseous $SO_3$ or the movement of the $SO_3$ blast across or along a stationary polymer web. Examples of the latter embodiment involve the use of a moving endless belt having an elongated slot therein overlying a polymer web in an enclosed chamber whereby gaseous $SO_3$ is pumped into the chamber and blasts out of the slot of the endless belt to contact and sulfonate the stationary polymer web. It is preferred to use the concept of a moving polymer web since this has the advantage that it can run continuously and at high speeds.

It is sometimes desirable to have only one side of the web surface sulfonated. Since a plastic web or film is relatively thin and has a large width and length, the term "major web surface" as used in the claims defines one of the two web surfaces having a relatively large width and length. The sulfonation of only one major web surface can be accomplished by turning off the $SO_3$ blast to the opposite major web surface. Alternatively, two polymer webs can be laid on top of each other and fed into the treatment chambers as a "sandwich" whereby only the top and bottom surfaces of this two ply polymer web is sulfonated.

It is desirable in the process of the present invention that after the sulfonation step, the treated polymer webs are contacted with a continuous blast of dry inert gas to remove excess $SO_3$. This removed $SO_3$ is then exhausted out of the surrounding area and can be disposed of by suitable means, e.g., neutralization with aqueous solutions of bases. Thus, contamination of the surrounding atmosphere does not take place.

If desired, the sulfonated polymer web can be neutralized with a fluid neutralization agent. Thus, the web can be dipped into or sprayed with an aqueous ammonium hydroxide solution, an inorganic basic solution such as sodium hydroxide, potassium hydroxide and the like. It is preferred to treat the sulfonated web with a gaseous neutralization agent such as ammonia gas or gaseous amines such as methylamine, ethylamine, dimethylamine and the like.

Still further treatments can be accomplished if desired. It is sometimes desirable to treat the sulfonated polymer web to an aqueous metal salt bath to form metal salts of the sulfonated polymer. In this step of the process the web is dipped into a dilute aqueous solution (about two percent by weight) of water soluble salts of silver, nickel, cadmium, zinc, magnesium and barium and then washed and dried.

DESCRIPTION OF DRAWINGS

The present invention is further illustrated by the drawings wherein.

DETAILED DESCRIPTION OF DRAWINGS

Figure 1:
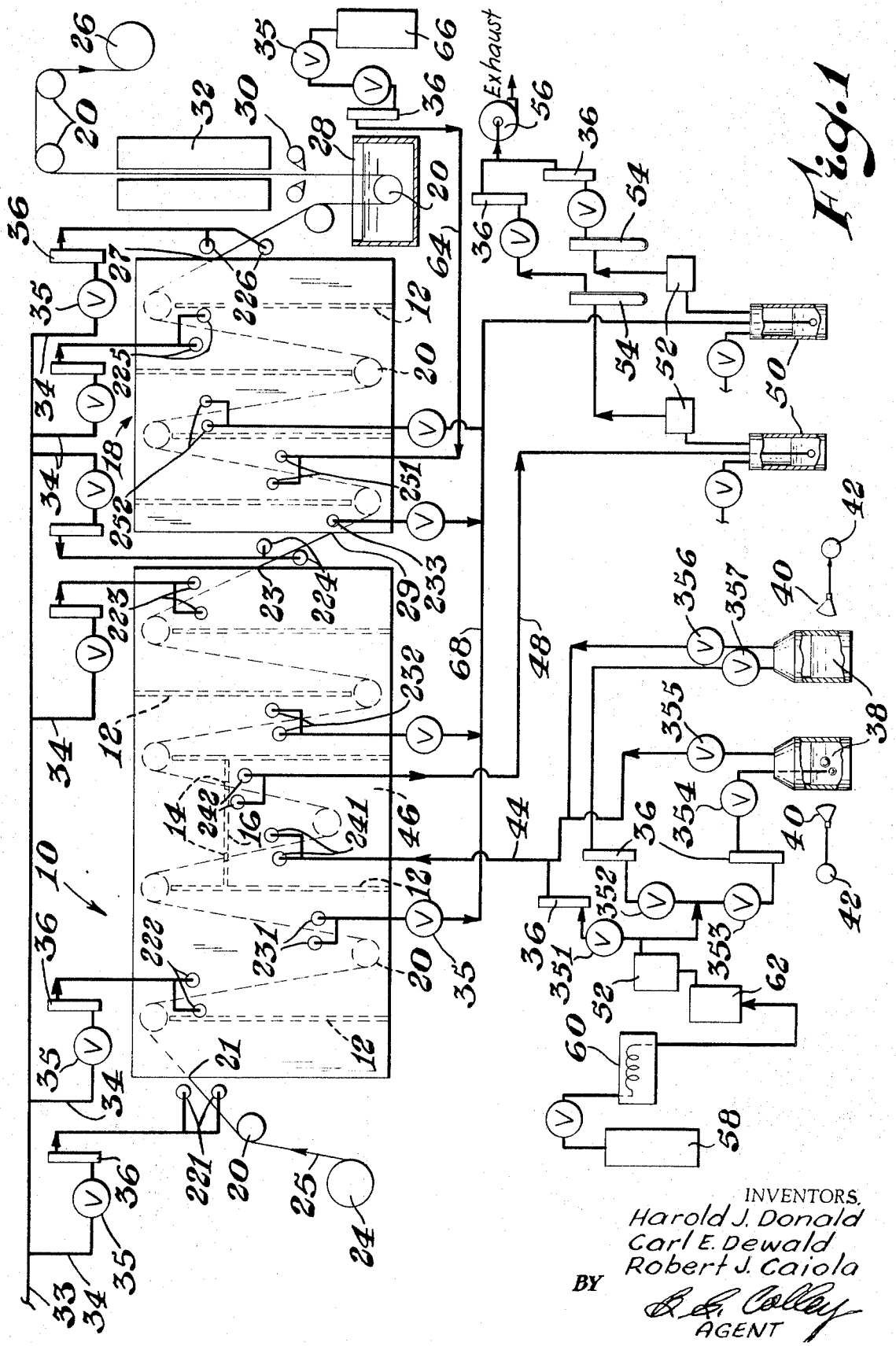
FIG. 1 is a schematic view showing one embodiment of the apparatus in which the polymer web 25 going through the sulfonation chamber 10 is treated with a sequence of dry gases provided by the associated equipment, given a water bath and dried before rewinding.

FIG. 1 shows one embodiment of the apparatus useful in this invention in which a sulfonation chamber 10 is associated with a neutralization chamber 18 together with various associated apparatus to supply gaseous $SO_3$ and gaseous ammonia which will be described later.

In chambers 10 and 18 there are a series of vertical baffles 12 which substantially divide the chambers 10 and 18 into a series of compartments. The horizontal baffle 16 in chamber 10 together with vertical baffles 12 define the sulfonation zone 46. The baffle 16 has inlet and outlet slots 14 for the passage of the polymer web.

The plastic web 25 is unwound from the feed roller 24 and fed into the inlet slot 21 of the sulfonation chamber 10 over an idler roller 20. Throughout the sulfonation and neutralization chambers there are suitably mounted a series of other idler rollers 20 at the upper or lower ends of the vertical baffles 12 to effectively divide chambers 10 and 18 into various zones.

The incoming polymer web 25 is scrubbed dry by the first inert gas tubular scrubbers 221 located adjacent to and outside the chamber 10 and further dried by a second set of inert gas tubular scrubbers 222 located inside the chamber 10. Tubular scrubbers 221 also insure that no moist air enters the sulfonation chamber 10. These tubular gas scrubbers and the related tubular exhausts are shown enlarged in FIG. 3 to illustrate the location of the exit slots 70 in relation to the plastic web 25. The scrubbers are located as indicated in FIG. 1 and extend across the width of the sulfonation and neutralization chambers with an axial slot 70 in them extending substantially the width of the chamber but somewhat less than the width of the polymer web in a manner similar to exit slot 71 of the scrubber box of FIG. 8.

The excess inert gas introduced into chamber 10 and any $SO_3$ that inadvertently leaks out of the sulfonation zone 46 through slots 14 is exhausted by means of the first inert gas tubular exhaust 231. The second inert gas tubular exhaust 232 performs a similar function on the downstream side of the sulfonation zone 46. The sulfonation zone 46 is provided with a pair of $SO_3$ tubular scrubbers 241 which are effective to rapidly permeate and sulfonate the polymer web. The excess $SO_3$ gas is exhausted from this zone 46 by a pair of tubular exhausts 242.

In order to remove excess $SO_3$ clinging to the polymer web, a third pair of inert gas tubular scrubbers 223 are provided to scrub the polymer web after treatment in the sulfonation zone 46.

The fourth pair of inert gas tubular scrubbers 224 located outside chamber 10 adjacent to the outlet slot 23 prevent the entrance of moist air from the ambient atmosphere.

In the neutralization chamber 18, similar sets of tubular scrubbers and exhausts are arranged. Tubular exhaust 233 removes any moist air that might pass through the entrance slot 29. Tubular scrubbers 251 provide a blast of ammonia gas to permeate and neutralize the sulfonated plastic web rapidly. The excess ammonia gas is removed by the tubular exhausts 252. The now sulfonated, neutralized plastic web is then scrubbed clean of clinging ammonia gas by the fifth set of inert gas tubular scrubbers 225. The entrance of moist air into the chamber 18 through the exit slot 27 is largely prevented by a sixth set of inert gas scrubbers 226.

The treated film is then washed in a water bath 28, blown free of water by air knives 30 and dried in an oven 32 before being wound up on take up roller 26.

The aforementioned dry inert gas is supplied to the chambers 10 and 18 by a supply line 33 having a series of branch lines 34 equipped with control valves 35 and flow rate meters 36. A suitable gas is dry nitrogen but dry air, dry carbon dioxide, and the like are also useful.

Dilute $SO_3$ gas is supplied to the chamber 10 through line 44 by vaporizing liquid $SO_3$ in tank 38 which is heated to about 33° C. by infrared heaters 40. The latter are controlled by rheostats 42 and are powdered by an electric power line (not shown). The $SO_3$ is normally diluted to about 2 percent by volume concentration in a dry inert gas such as carbon dioxide by bubbling the inert gas through the liquid $SO_3$ and controlling the dilution by means of a series of valves 351–357. However, it can be used at 15 percent concentration or higher if greater sulfonation speed is desired. The inert diluent gas, carbon dioxide, sulfur dioxide, nitrogen, and the like is supplied by a tank 58. After leaving the tank 58 the gas is warmed by heater 60, dehydrated in a drier 62, filtered in an aerosol filter 52, and bubbled into the molten $SO_3$ in tank 38 at a rate measured through the meters 36.

The exhaust gases from the sulfonation zone 46 are fed through line 48 into the 95 percent sulfuric acid adsorbing tank 50, filtered in an aerosol filter 52 and exhausted to the atmosphere through a pressure measuring device 54 and meter 36 by means of a fan 56.

The gases removed from tubular exhausts 231 and 232 by line 68 receive similar treatment.

Figure 2:
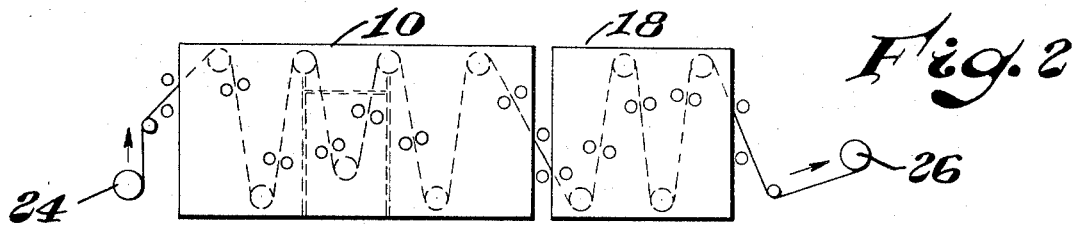
FIG. 2 is a similar schematic view without the associated equipment showing apparatus in which the polymer web is sulfonated and neutralized with gaseous ammonia only.

In FIG. 2, the sulfonation chamber 10 and neutralization chamber described above are illustrated in which the water bath is eliminated.

Figure 3:
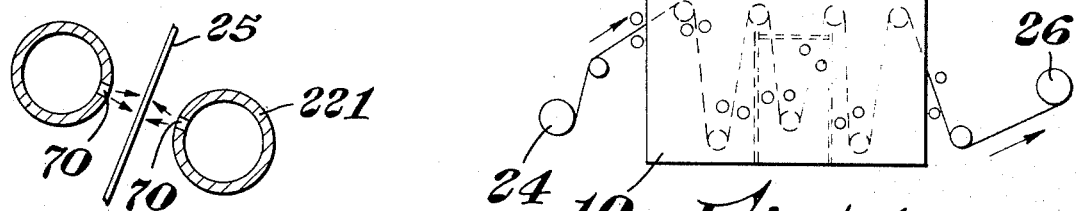
FIG. 3 is a detailed view showing the blast-like action of the gaseous tubular scrubbers.

In FIG. 3, a tubular scrubber 221 is illustrated showing the blast or curtain of gas directed towards the polymer web 25. All the tubular scrubbers and scrubber boxes operate in this manner.

Figure 4:
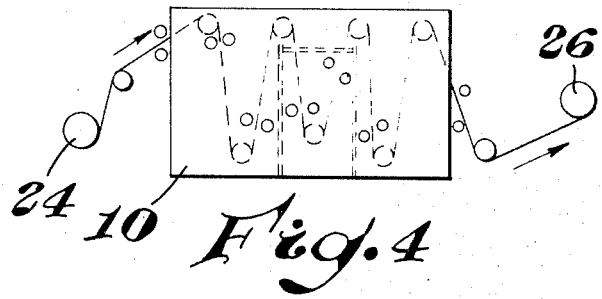
FIG. 4 is a schematic view of the apparatus for sulfonation only.

FIG. 4 illustrates an embodiment of this invention wherein only the sulfonation chamber 10 is used to treat the polymer web 25.

Figure 5:
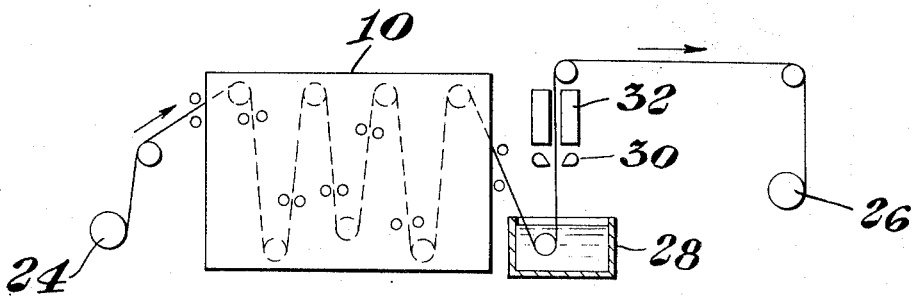
FIG. 5 is a schematic view showing the apparatus for sulfonating, washing and drying the polymer web.

FIG. 5 illustrates an embodiment similar to FIG. 1 in which the neutralization chamber 18 is eliminated.

Figure 6:
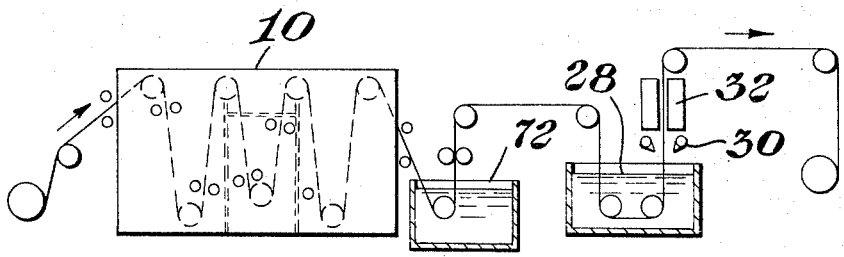
FIG. 6 is a schematic view showing the apparatus for sulfonating the polymer web, treating it to a metal salt bath, washing, and drying.

FIG. 6 illustrates a further embodiment in which the polymer web is sulfonated in a sulfonation chamber 10, dipped into a metal salt bath 72, washed in a water bath 28, blown free of water by air knives 30 and dried in an oven 32.

Figure 7:
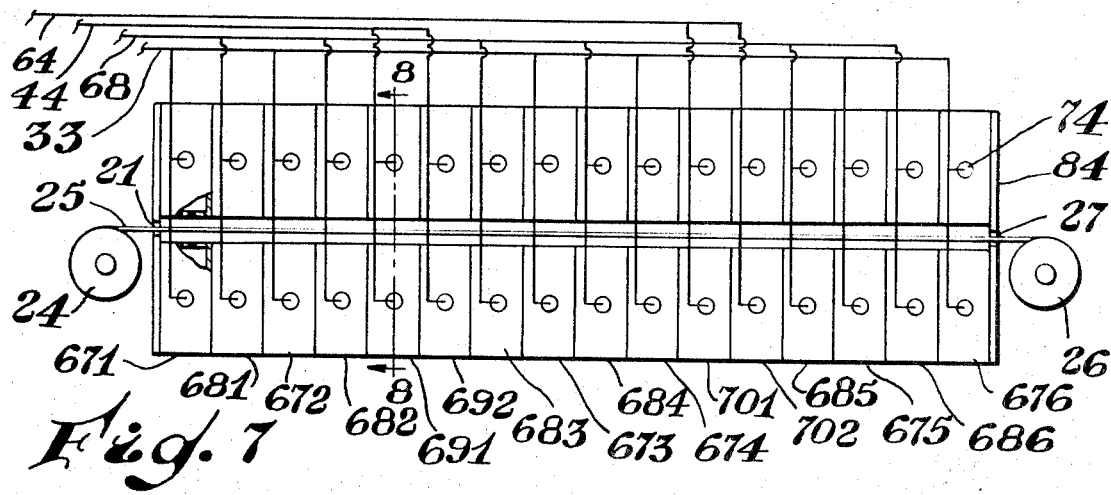
FIG. 7 is a schematic view of a modified version of FIG. 1 using the same associated equipment showing the use of aligned scrubber boxes.
Figure 8:
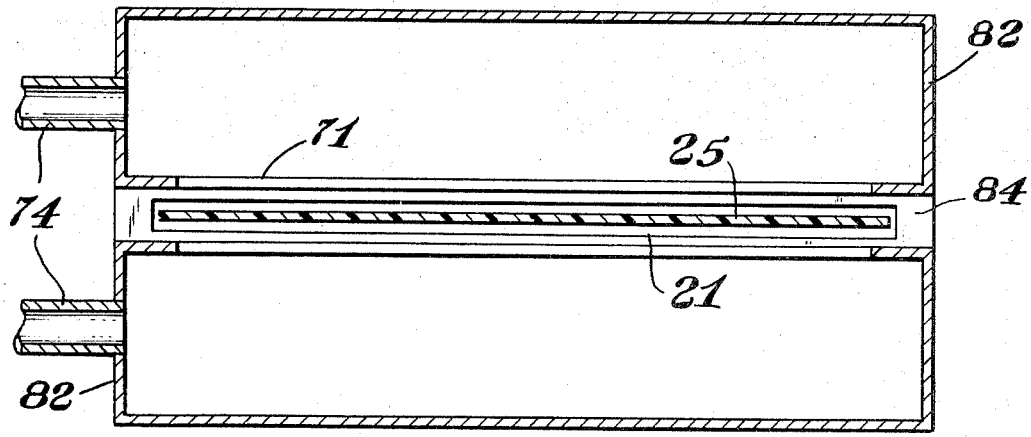
FIG. 8 is a cross sectional view on line 8—8 of FIG. 7 showing the relative position of the polymer web 25 in the inlet slot 21.
Figures 9, 10, 11:
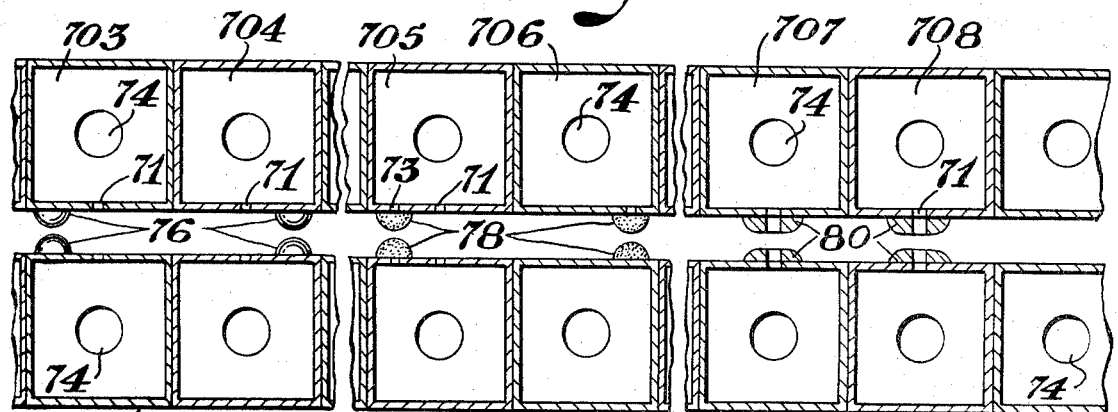
FIG. 9 is an enlarged view of a modified sulfonation scrubber box showing the use of half-round weirs 76.
FIG. 10 is a similar view showing the use of porous half-round weirs 78.
FIG. 11 is a similar view showing the use of quarter-round weirs 80.

In FIG. 7 an assembly of inert gas scrubber boxes, sulfonation scrubber boxes, neutralization scrubber boxes, and exhaust boxes are shown. These scrubber boxes are mounted side-by-side in alignment by suitable mounting means between outer side walls 82 and outer end walls 84. If desired, each box can be rectangular in shape as illustrated in FIG. 7 or square shaped as shown in FIGS. 9–11. It is to be understood that the shape of the box is not critical. The outer side walls 82 normally provide the ends walls for each box but it is apparent that each box can have its own end wall if desired. Each scrubber box is provided with an inlet tube 74 and an exit slot 71 as shown by FIG. 8.

In general, the sequence of steps in treating the polymer web using the apparatus of FIG. 7 is similar to the foregoing apparatus. An advantageous feature of this modification is that it can readily be modified to suit any new problem. Thus, if more speed of sulfonation is required, one can add more sulfonation scrubber boxes. Likewise, if more adequate removal of water is needed, one can simply add more inert gas scrubber boxes before the sulfonation boxes. A further feature is that the polymer web floats through this apparatus on a layer of gases and no contact with solid parts, i.e., rollers, occurs. This completely eliminates any scratches on the polymer web which is of importance when the web is a clear transparent film such as oriented polystyrene film or polyethylene film.

In FIG. 7, the first inert gas scrubber box 671 scrubs the polymer web and removes moist air. The first inert gas exhaust box 681 removes the excess inert gas. This is repeated by boxes 672 and 682, respectively, and can be duplicated over again to insure substantially complete dryness.

The sulfonation step is accomplished by the first and second $SO_3$ scrubber boxes 691 and 692.

After removal of excess $SO_3$ by the third exhaust box 683, the web is again scrubbed by inert gasses from the third and fourth scrubber boxes 673 and 674, respectively. These are removed by the fourth exhaust box 684.

After treatment of the plastic web by ammonia gas from the ammonia scrubber boxes 701 and 702, the scrubbing and exhausting of excess gasses is repeated in units 685, 675, 686, and 676.

FIG. 9 illustrates modified $SO_3$ scrubber boxes 703 and 704 in which half-round weirs 76 are mounted on the upper and lower boxes and extend the full length of the exit slot 71 so as to create a sulfonation area which is more completely enclosed than that shown in FIG. 7. This results in a more complete sulfonation in the enclosed area and the plastic web is substantially centered in this area by virtue of the gases escaping over the weirs 76.

FIG. 10 shows further modified $SO_3$ scrubber boxes 705 and 706 similar to FIG. 9 in which sintered metal or porous metal half-round weirs 78 are used. These wires 78 are provided with a slot 73 extending the full length of the exit slot 71 so that the $SO_3$ gas can penetrate through the porous weir to provide additional "floating action" with a concurrent reaction with the plastic web upon contact with it.

FIG. 11 shows still further modification of these sulfonation boxes 707 and 708 in which quarter round weirs 80 are provided adjacent each side of the exit slot 71 and these extend the full length of the slot 71.

It is to be understood that the materials used to construct the above described apparatus are not critical and will be readily apparent to those skilled in the art, keeping in mind that $SO_3$ is a highly reactive compound.

What is claimed is:

1. In a method of sulfonation of a polymer web by contact of at least one of the major web surfaces with gaseous sulfur trioxide, the improvement which comprises subjecting the web surface which is substantially dry to a continuous blast of dry gaseous sulfur trioxide in a substantially dry atmosphere by directing the blast in the form of a sheet of gas molecules flowing at a rate greater than 10 feet per second to a small area extending substantially across one dimension of the web surface and moving the web and blast relative to one another in the direction of the other dimension of the web at a substantially constant rate.

2. The method of claim 1 in which is included the step of drying both major web surfaces prior to the sulfonation step.

3. The method of claim 2 in which the drying step comprises contacting the both major web surfaces with a continuous blast of a dry inert gas.

4. The method of claim 1 in which only one major web surface is contacted with a continuous blast of dry gaseous sulfur trioxide.

5. The method of claim 1 in which a two ply polymer web is sulfonated.

6. The method of claim 1 which includes the subsequent step of contacting both major web surfaces with a continuous blast of dry inert gas to remove excess sulfur trioxide.

7. The method of claim 3 in which said polymer web moves through the blasts of dry inert gas and gaseous sulfur trioxide respectively.

8. The improvement of claim 1 in which the blast is a sheet of gas molecules flowing at a rate in the range of from about 100 to about 200 feet per second.

9. The improvement of claim 1 in which the gaseous sulfur trioxide is from about 2 to about 15 volume percent sulfur trioxide in dry inert gas.

10. The method of claim 1 which includes the step of contacting at least one major web surface with a fluid neutralizing agent subsequent to contacting said surface with the blast of gaseous sulfur trioxide.

11. The method of claim 1 which includes the step of contacting both major web surfaces with a fluid neutralizing agent subsequent to contacting said surface with the blast of gaseous sulfur trioxide.

12. The method of claim 10 which includes the additional step of contacting the web surface with an aqueous metal salt bath.

References Cited

UNITED STATES PATENTS

| | | | |
|---|---|---|---|
| 2,187,837 | 1/1940 | Paasche | 117—105.3 |
| 2,400,720 | 5/1946 | Staudinger | 117—118 |
| 2,786,780 | 3/1957 | Walles et al. | 117—118 X |
| 2,832,698 | 4/1958 | Walles | 117—47 X |
| 2,832,699 | 4/1968 | Walles | 117—47 X |
| 3,516,843 | 6/1970 | Knowlton | 117—34 |
| 2,715,076 | 8/1955 | Wolinski | 117—47 X |

WILLIAM D. MARTIN, Primary Examiner

W. R. TRENOR, Assistant Examiner

U.S. Cl. X.R.

117—105.3, 106, 48, 118, 62.1, 138.8 R; 260—686